US008281996B2

(12) United States Patent
Mendelsohn

(10) Patent No.: US 8,281,996 B2
(45) Date of Patent: Oct. 9, 2012

(54) RADIATION DOSE EXPOSURE CARD

(76) Inventor: Steven Mendelsohn, Lindenhurst, NY (US)

(*) Notice: Subject to any disclaimer, the term of this patent is extended or adjusted under 35 U.S.C. 154(b) by 0 days.

(21) Appl. No.: 12/928,201

(22) Filed: Dec. 6, 2010

(65) Prior Publication Data

US 2011/0147470 A1 Jun. 23, 2011

Related U.S. Application Data

(60) Provisional application No. 61/283,568, filed on Dec. 4, 2009.

(51) Int. Cl.
*G06K 7/00* (2006.01)

(52) U.S. Cl. ......... 235/435; 235/457; 235/487; 235/494

(58) Field of Classification Search .................. 235/435, 235/457, 487, 494
See application file for complete search history.

(56) References Cited

U.S. PATENT DOCUMENTS

| | | | | |
|---|---|---|---|---|
| 5,173,609 A * | 12/1992 | Lacoste et al. | ........... | 250/370.07 |
| 2006/0060648 A1 * | 3/2006 | Valenza | ........................ | 235/380 |

* cited by examiner

*Primary Examiner* — Kristy A Haupt
(74) *Attorney, Agent, or Firm* — Thomas A. O'Rourke; Bodner & O'Rourke, LLP

(57) ABSTRACT

An apparatus for storing and informing health care professionals of patient's radiation exposures may comprise a radiation dosage history card, being a pre-printed card with a magnetic stripe. The card, having originating medical provider information preprinted thereon, may comprise one or more removably attached placards. A first removable placard may comprise a visual listing of a currently administered radiation dose and dosage date. A second removable placard may comprise a listing of: a year-to-date total radiation dosage, and a total tracked radiation dosage; while a third removable placard may comprise a list of each previous radiation dosage, treatment type, treating medical center, and date of said previous radiation dosage to comprise the total tracked radiation dosage. The placard data may be coordinated to match the data encoded upon the magnetic stripe. Data may be electronically mailed between present and previous medical providers to maintain an up-to-date universal exposure record.

25 Claims, 5 Drawing Sheets

RADIATION DOSE EXPOSURE CARD

CROSS REFERENCES TO RELATED APPLICATIONS

This application claims priority on U.S. Provisional Application Ser. No. 61/283,568 filed on Dec. 4, 2009, the disclosures of which are incorporated herein by reference.

FIELD OF THE INVENTION

The present invention relates to an apparatus and system for storing and informing health care professionals of the dosage of radiation that a patient has been exposed from radiographic medical procedures. This apparatus and system will allow healthcare professionals to make informed decisions over whether a radiographic medical procedure should be postponed over concerns of too much radiation exposure.

BACKGROUND OF THE INVENTION

Radiation describes any process in which energy emitted by one body travels through a medium or space to ultimately be absorbed by another body. Where nuclear materials are concerned, radiation may be further considered to be the energy being transmitted as particles or waves, particularly the gamma rays emitted during nuclear decay. Some types of radiation possess enough energy to ionize particles, which may involve an electron being knocked out of an atom's electron shell, thereby giving it a positive charge. These radiation effects are often disruptive in biological systems and can result in mutations and cancer.

The scientific unit of measurement for a dose of radiation depends not only upon the system of measurement—English or Metric—but also upon the aspect of radiation that is being considered. For the amount of radiation being emitted by a radioactive material into the environment, the conventional unit is the "Curie" (Ci), which is named after Marie Curie for her research on the highly radioactive element radium, and using the System Internationale (SI, or metric system), the units are the Becquerel (Bq). For example, the amount of radioactive material estimated to have been accidentally released by the Chernobyl nuclear power plant in the Soviet Union in 1986 was 81 million CI of radioactive cesium.

Where a person is exposed to radiation and energy is deposited into the tissues of the body, the amount of energy deposited per unit of weight of human tissue is known as the absorbed dose, which is measured either in the conventional units—the "Rad" (radiation absorbed dose), or in the SI units—the "Gray" (Gy). However, since different tissues and organs of the body have varying sensitivities to radiation exposure, the actual risk from radiation exposure to different parts of the body varies, and is reflected in two other types of measurements.

The measure of a dose of radiation in terms of its potential to cause damage is known as the Equivalent Dose ($H_T$), and is defined as:

$$H_T = W_R D_{T,R}$$

Where $D_{T,R}$ is the absorbed dose delivered by radiation type R averaged over a tissue or organ T; and $W_R$ is the radiation weighting factor for the radiation type R, which is a measure of the biological damage producing potential of the radiation R. The units for the dose equivalent is the "rem" (the roentgen equivalent in man), and in the SI system, it is the "Sievert," which is more conveniently expressed as the millisievert (mSv, or $10^{-3}$ Sievert).

The Effective Dose (E) is defined as the summation of the tissue equivalent doses each being multiplied by the appropriate tissue weighting factor, Wt, to indicate the combination of different doses to several different tissues, as shown by the following formula:

$$E = \Sigma W_T H_T$$

(see "Relative Biological Effectiveness (RBE), Quality Factor (Q) and Radiation Weighting Factor ($w_R$)," in the Oxford Journal, Radiation Protection Dosimetry, Edited by J. Valentin, Published by: ICRP Publication 92, Annals of the ICRP, Vol: 33(4), 117 pp (2003), available at http://rpd.oxfordjournals.org/content/108/3/270.extract, the disclosures of which are incorporated herein by reference).

Unbeknownst to many of us, the average person is exposed to radiation throughout the year, even while simply undergoing the activities of routine daily living, because of natural background radiation. Natural background radiation comes from two primary sources—terrestrial sources, and cosmic radiation. The world-wide average "background" dose of radiation received by a human being is 2.4 mSv per year, which is mostly from cosmic radiation originating principally from the sun, and due to natural radionuclide found in our environment, such as the radon gas released from the earth's crust, which may attach to airborne dust. The average person in the United States receives approximately 3 mSv per year, while individuals in certain areas around the world, such as the Flinders mountain range in southern Australia and the region around Ramsar, Iran, receive significantly higher annual doses.

The annual limit on intake (ALI) is the derived limit for the amount of radioactive material that is taken into a body of an adult by inhalation or ingestion in a single year. The ALI is the smaller value of either the intake of a given radionuclide in a year by a reference man that would result in a committed effective dose equivalent of 0.05 Sv (50 mSv or 5 rems), or a committed dose equivalent of 0.5 Sv (500 mSv or 50 rems) to any individual organ or tissue.

Radiation exposure is a major concern in both adults and children. Radiation effects on a person begins at the lowest level and progresses upward, in that radiation causes ionization of atoms, which may affect molecules in a cell, which may then effect the cell itself, which could affect tissues, which may affect an entire organ, which may thereafter affect the entire body. The health effects due to exposure to radiation may be categorized as direct effects or indirect effects. Where direct effects occur, radiation has interacted directly with an atom of the DNA molecule or other critical cell component. If a sufficient number of atoms are affected, the life-sustaining nature of the cell may be destroyed, such as where atoms in the chromosomes become damaged and no longer replicate properly, or where the information in the DNA molecule has been significantly altered. Indirect radiation effects occur because a cell is mostly water, which reduces the probability that the radiation will interact with the DNA molecule, but the radiation may break the bonds of a water molecule, producing hydrogen (H) and hydroxyl (OH) fragments, which may combine with other fragments or ions to form toxic compounds, such as hydrogen peroxide ($H_2O_2$), which can lead to the destruction of the cell.

In some cases, where a cell or many cells have been damaged, they may nonetheless be able to completely repair themselves. If the damage is severe enough, the cells may die, however, they may be able to partially repair themselves, but thereafter their children cells may be damaged and be unable to survive. It is also possible for one or more cells to be damaged to the point where mutation occurs, and reproduction perpetuates the mutation, which could lead to a tumor. The factors that determine these effects are the (1) dose rate, (2) total dose received, (3) energy of the radiation, (4) area of the body exposed, (5) individual sensitivity, and (6) cell sensitivity.

In addition to natural background radiation, where even a round-trip transcontinental flight may result in an additional 0.55 mSv of radiation exposure, an individual's annul dose of radiation may be received from many manmade sources. These manmade sources may include: the tritium in self-luminous watches and dials; the thorium using in the incandescent mantle of camping lanterns; the thorium found in tobacco; the Americium found in smoke detectors; the cesium used in coal plants to determine the ash and moisture content of its burnt fuel, as well as the uranium and thorium released in the fly ash of the burnt coal; the x-ray radiation produced by television cathode ray tubes; airport x-ray systems; and the radiation from normal operations of nuclear power plants and nuclear processing facilities, as well as accidents occurring therein. Moreover, manmade radiation exposure may occur to medical patients undergoing radiographic procedures—diagnostic procedures or treatments.

Treatment in the form of radiation therapy, also known as radiation oncology (XRT), may involve the targeting of ionizing radiation onto malignant cancer cells to be curative, adjuvant (preventative), or palliative (providing symptomatic relief through local disease control). The goal of these treatments being to damage the DNA of the cancer cells using either photon or charged particle energy. For curative treatments, a typical dose may be 20 to 40 GY for lymphomas, or 60 to 80 GY for epithelial tumors. Preventative treatments may typically total 45-60 Gy, in 1.8 to 2.0 Gy fractions.

Radiographic imaging may occur in many different forms. In nuclear medicine imaging, radiopharmaceuticals may be taken internally (intravenously or orally), which permits the emitted radiation to be imaged. Conversely, other techniques of diagnostic nuclear medicine involve passing external radiation through a person's body to form an image, with these methods usually being organ or tissue specific. One of the most common methods has been the "X-ray," with its use beginning around 1895. X-rays are electromagnetic radiation having wavelengths in the range of 0.01 to 10 nanometers.

Diagnostic x-ray examinations may be separated into different categories—low dose examinations and high dose examinations. For low dose exams, such as a simple chest x-rays, the decision to have one is easy, since exposure is minimal. The radiation exposure from one chest x-ray is roughly 0.1 to 0.2 mSv, and can be compared to the amount of radiation exposure that an individual experiences from natural surroundings in ten days.

Anatomical imaging from higher dose x-ray examinations may occur through the use of a CT scan (Computed Tomography scan), which involves digital geometry processing to create a three-dimensional image of the inside of an object, from a large series of two-dimensional x-ray images taken around a single axis of rotation. The CT scan was introduced in the mid-1970s, and has since been widely adopted as a valuable medical tool for diagnosing disease, trauma, or abnormality, and for planning therapeutic regimens. However, it exposes the patient to significantly higher doses of radiation, with the radiation dose from one CT scan possibly being equivalent to the dose from hundreds of chest x-rays. For example, where a normal chest x-ray may result in 0.1 to 0.2 mSv of exposure, a head CT may result in 1.0 to 2.0 mSv; a chest CT may result in 5-7 mSv; an abdomen and pelvic CT may result in 8 to 14 mSv; a coronary artery CTA may result in 5 to 15 mSv; and a neonatal abdomen CT may result in 20 mSv of exposure. For a person having a medical need, the lifesaving benefits of administering a therapeutic or diagnostic CT procedure will likely far outweighs the cancer risk associated with the exam.

Although the amount of radiation used in diagnostic nuclear medicine is deliberately maintained within a safe limit, and adheres to the ALARA ("as low as reasonably possible") principal proffered by the International Commission on Radiological Protection (ICRP), the risk of developing a cancer increases as a patient's frequency of administration increases. In addition to the profusion of x-rays being used to form the 3-dimensional CT image, the CT scan may involve the use of a contrast agent-material such as barium sulfate or iodine, which may further increase the risks of causing cancer.

Thus, there is a commitment in the field of radiology to avoid all unnecessary exposures, and when unavoidable, to make every reasonable effort to reduce exposure, which may include exposure to the isotopes of iodine (I-131), technetium (Tc-99m), cobalt (Co-60), iridium (Ir-192), cesium (Cs-137), and others. It is therefore a good idea for a patient that has had, or continues to have, frequent radiological exposure, to have access to a record of his or her history in order to help his or her healthcare professional make an informed decision about further examinations and treatment programs. Because a patient may receive exposures from a number of medical professionals, the invention herein discloses a unique method of accounting for all such exposures, and of protecting a patient from unnecessarily high cumulative doses of radiation.

OBJECTS OF THE INVENTION

It is an object of the invention to provide an apparatus and system for storing and tracking an individual's history of radiation exposure from radiographic procedures.

It is also an object of the invention to provide a health care professional with the information necessary to make an informed decision on whether to administer a radiographic procedure.

It is another object of the invention to keep individuals informed of their radiation exposure history.

SUMMARY OF THE INVENTION

The present invention relates to a radiation dose exposure card that stores, communicates with and informs health care professionals of an individual's radiation exposure history. The radiation dose exposure card informs a health care professional of an individual's personal identification, as well as other information such as their name. It also informs a health care professional of the type of radiographic procedure that was administered, where anatomically the procedure was administered, the dosage amount in mSv, and the name, address and contact information of the place administering the procedure. In addition, the exposure card may include other information such as comparative dosage values of other radiation sources to give an individual an informed perspective. This card will ultimately allow health care professionals to make informed decisions on whether to administer a radiographic procedure based on an individual's radiation exposure history.

In the preferred embodiment, the radiation dose exposure card contains personal, informative, and procedural information on its front and back cover. On its front cover is listed informative information which includes the place of administration's contact information such as its name, address, phone number and website. The personal information of the patient is also listed on the front cover such as the patient's name. Further, procedural information such as the type of procedure, place on the body where the procedure was administered, the date of the procedure and the dose of radiation exposure in mSv is listed. Finally, more informative information is listed such as identification that the card is a Radiation dose card. On its back cover is also listed the place of administration's contact information, such as its name and phone number, as well as other informative information such as comparative dose values of other radiation sources. In other embodiments, the information can be listed anywhere as desired on either sides of the card.

In another embodiment, the card may have a chip embedded in the card or on its front or back surface in conjunction with having all or some of the personal, informative and/or procedural information listed on its surfaces. The chip may be of any shape and size. Information may be stored on the chip in addition to its listing on the card so that it can be downloaded for a radiologist or other health care professional to view. Data from the procedure may also be uploaded to the chip. The chip may contain all or some of a patient's personal information, other informative information, and procedural information. The card may function as a specific dose exposure card in which the card has listed and/or the chip has stored a person's personal information, other informative information, and/or procedural information pertaining to the specific exam. Alternatively, the card may function as a general dose exposure card in which the card has listed and/or the chip has stored a patient's personal information, other informative information, and/or a patient's radiographic procedure history.

According to a different embodiment, the card may have a chip, with all of the properties and capabilities described previously herein, in conjunction with a digital display screen of any type, and in conjunction with having all or some of the personal, informative and/or procedural information listed on its surfaces. The chip may be of any shape and size and may be placed on the card's front or back surface irrespective of the digital screen. The digital screen may be of any shape and size and may be placed on the card's front or back surface irrespective of the chip's location. The digital screen and chip may store and/or display a patient's personal information, informative information, and/or procedural information. In this and all other embodiments that contain a chip and a digital display screen, the chip may act as the storage device for the display screen or the card may contain a hard drive or other storage device, separate from the chip that stores the information to be displayed. The card may function as a general dose exposure card in which the card has listed, displayed on the screen, and/or the chip has stored a patient's personal information, other informative information, and/or a patient's radiographic procedure history. The card may alternatively function as a specific dose exposure card in which the card has listed, the screen has displayed, and/or the chip has stored a person's personal information, other informative information, and/or procedural information pertaining to the specific exam.

In another embodiment, the card may be comprised of a chip and a display means, which may include, but is not limited to, a digital display screen of any type, both of which have all of the properties and capabilities described previously herein. The card may function as a specific or general radiation dose exposure card.

In another embodiment, the card may contain a digital display screen, with all of the properties and capabilities as previously described herein, in conjunction with some or all of the personal, informative, and/or procedural history listed on the card's surfaces. The card may function as a general or specific radiation dose exposure card. In this and all other embodiments containing a digital display screen without a chip, the card may contain a hard drive or other storage device in order to store information to be displayed on the digital screen.

In a different embodiment, the card may contain only a digital display screen and may function as a specific or general card radiation dose exposure card.

In another embodiment, the card may contain a magnetic stripe on its back surface in conjunction with some or all of the personal, informative and/or procedural information being listed on the card's surfaces. The card may function as a general dose exposure card in which the card has listed and the magnetic stripe has stored a patient's personal information, other informative information, and/or a patient's radiographic procedure history. The card may alternatively function as a specific dose exposure card in which the card has listed and the magnetic stripe has stored a person's personal information, other informative information, and/or procedural information pertaining to the specific exam.

Alternatively, the card may be comprised of a magnetic stripe in conjunction with a digital display screen and the card may have listed on its surfaces some or all of the personal, informative, and/or procedural information. The digital display screen and magnetic stripe may contain all of the properties and capabilities as previously described herein. The card may also be a general or specific radiation dose exposure card.

The card may optionally be comprised of a display means including but not limited to a digital display screen and a magnetic stripe. The digital display screen and magnetic stripe may contain all of the properties and capabilities as described herein. The card may also function as a specific or general radiation dose exposure card.

In conjunction with all of the embodiments of the present invention that contain a digital display screen, the digital screen may be encrypted and therefore the card may contain a keypad or some other inputting device to unlock the digital screen. Further, in these digital screen embodiments, the card may contain a navigation tool on the card's surface in order to navigate through the digital screen's displays.

DETAILED DESCRIPTION OF THE INVENTION

The increased use of radiographic treatment and imaging procedures has led to concerns that exposure of patients to unhealthy cumulative dosages of radiation may occur without the awareness of either the patient or the array of doctor that maybe attending to the patient. Therefore, the radiation dose exposure card and system disclosed herein is particularly adapted to permit a plurality of medical practitioners to track and update a permanent record of a patient's exposure to radiation dosages and other types of radiation exposures. This comprehensive record or history of a patient's radiation exposure may permit one or more healthcare professionals to make an informed decision as to whether or not a scheduled procedure should be postponed. Providing a means that stores and informs health care professionals of an individual's radiation exposure history will enable a professional to make this decision.

Figure 1A:
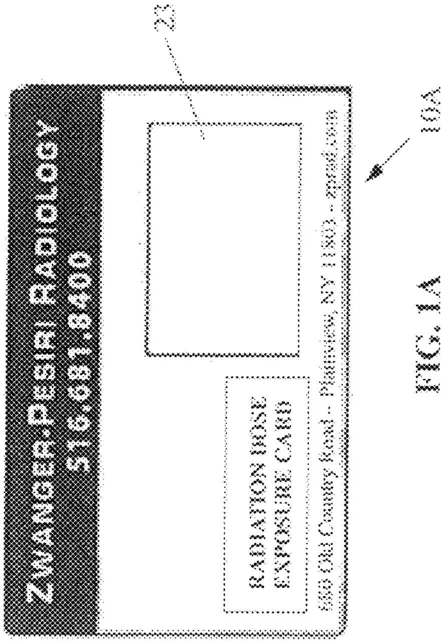
FIG. 1A shows the front side of the radiation dose card of FIG. 1, prior to having custom dosage information printed thereon, and only showing the pre-printed card information.
Figure 1:
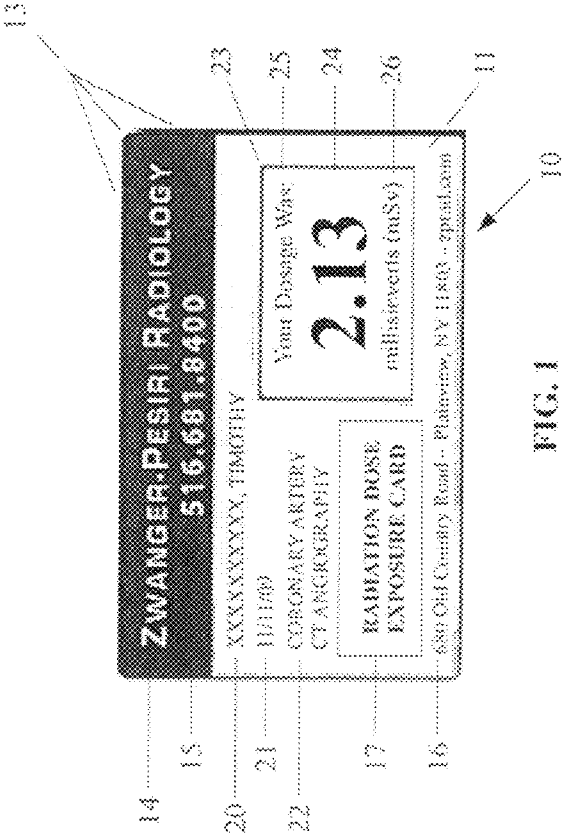
FIG. 1 shows the front side of a first embodiment of the radiation dose card of the present invention, having custom dosage information printed thereon.
Figure 2:
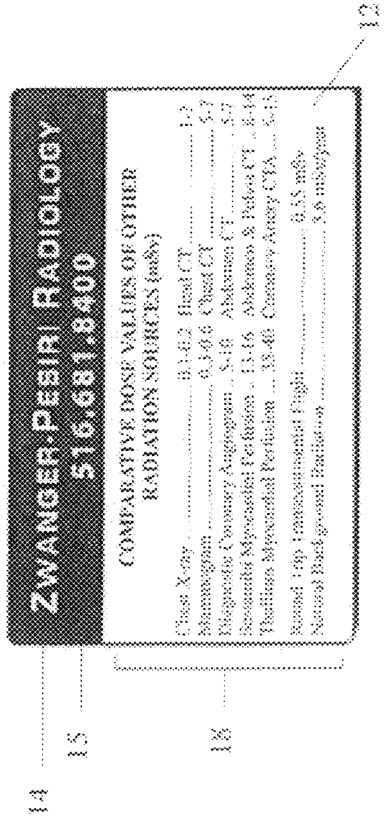
FIG. 2 shows the back side of the radiation dose card of FIG. 1.

In a first embodiment of the present invention, shown in FIGS. 1-2, a radiation dosage exposure card 10 may comprise a card having a front surface 11 and rear surface 12, and one or more peripheral edge surfaces 13. The card may be made of paper, cardboard, plastic, or any other suitable material. The front surface 11 and rear surface 12 may include substantial areas containing information that is pre-printed upon those surfaces. These preprinted areas may include the name 14 of the medical practitioner(s) issuing the radiation dosage card, which in this case is "Zwanger-Pesiri Radiology," and a phone number 15 for that medical practitioner 14 to permit ease of contact and coordination therewith by various other medical practitioners that may also be treating the same patient. The issuing practitioner's mailing address 16 and email address may also preferably appear on the card. The card 10 may include an explicit textual reference 17 to denote that the card is a "RADIATION DOSE EXPOSURE CARD," to thereby alert any individual who may not be familiar with the card, as to its function and the process as herein described. The rear surface of the card may also contain an illustrative list 18 of the different radiation dosages for certain medical procedures.

In addition to such information that may be preprinted upon the front and rear surfaces of the card, other custom information may also be therein entered—typed or printed—and may preferably be located on the front of the card. This information may include the patient's name 20, and the issue date of the card 21, which may possible correspond to the first treatment date. The type of radiographic procedure 22 performed may also be listed, which in this example was a Coronary Artery CT (Angiography). In another portion of the front surface of the card, a rectangular area 23, dosage information may be printed thereon so as to provide a quick visual indication as to the last radiation treatment incurred by the patient. For the coronary artery CT performed by Zwanger-Pesiri radiation, which may be performed using a CT Flash scanner for reduced radiation exposure, the dosage, listed with a textual reference 25 stating, "Your dosage was:", may printed thereon. The printed dosage amount 24 may be "2.13" millisieverts. The units 26 for the dosage may be listed below the dosage amount 24, which here are stated in full as "millisieverts" and with the corresponding abbreviation "mSv."

This custom treatment information may be typed onto the card using a conventional typewriter, or may preferably be entered onto the card by first being entered, using a computer keyboard, into a standard form within a word-processing program, which may be part of an ordinary patient record. Then a print command may be executed to print the required data onto a card 10A that only has the preprinted information located thereon, as seen in FIG. 1A.

Figure 3A:
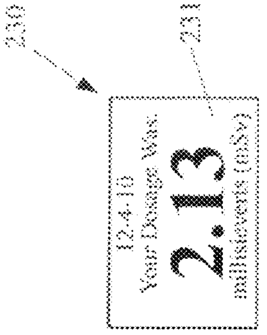
FIG. 3A shows the front side of a removable dosage placard.
Figure 3B:
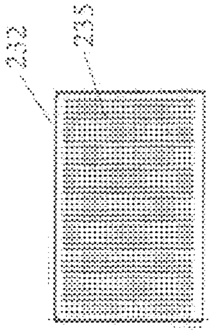
FIG. 3B shows the rear side of the removable dosage placard of FIG. 3A.
Figure 3:
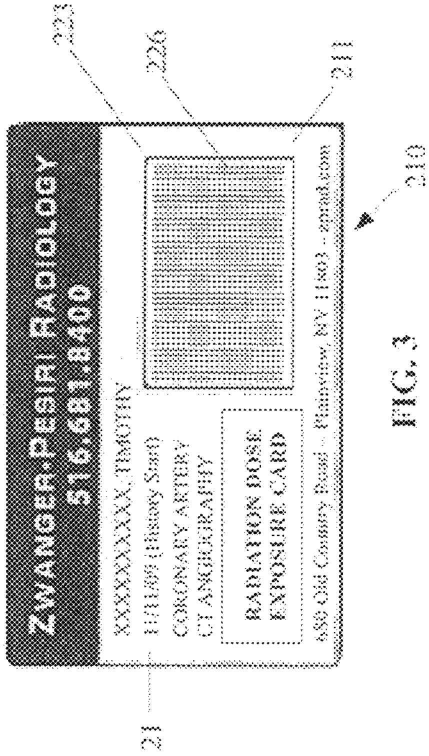
FIG. 3 shows the front side of a second embodiment of the radiation dose card of the present invention, having removable dosage placards being affixed using a hook and loop means.

In a second embodiment (FIG. 3), the front surface 211 of card 210 may be the same as for card 10, except that the currently administered dose information may instead be preferably printed onto a front surface 231 of a removable placard 230, as seen in FIG. 3A. The placard 230 may be paper, cardboard, or any other suitable material. In one embodiment of the placard 230, a roll of printable labels may used to produce the placard, such as the labels found at http://www-.mercurylabels.com/, which may allow a label or placard to be printed from a computer database and peeled off one at a time for application onto the card, as they may comprise a self-adhesive label.

Figure 4:
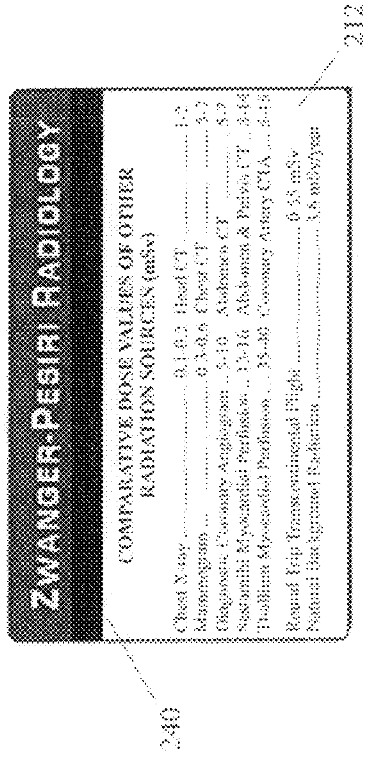
FIG. 4 shows the back side of the radiation dose card of FIG. 3.

In another embodiment of the placard, where a self-adhesive label is not used, the placard 230 may alternatively be affixed to the rectangular area 223 of card 210 using a hook and loop fastening system, such as the one shown by expired U.S. Pat. No. 3,461,513 to Girard, the disclosures of which are incorporated herein by reference, and which may be available at www.velcro.com. The rear surface 232 of the dose information placard 230 may have bonded thereto, a strip 235 comprising the hook portion of the hook and loop fastening system, while the rectangular area 223 of the card 210 may have bonded thereto, a strip 236 comprising the loop portion of the fastening system. With the placard 230 being secured using the strips 235 and 236 to the card 210, card 210 may visually appear the same as does card 10 in FIG. 1. However, the hook and loop fastening system of strip 235 and 236 being used in conjunction with the placard 230 permits the same radiation dose exposure card to be used repetitively, and thus adds critical functionality, in that a magnetic strip 240 may be incorporated into the card 210, as seen on the rear surface 212 of card 210 in FIG. 4.

The magnetic stripe 240 may, for example, be of the type according to expired U.S. Pat. No. 4,297,570 to Kowalski, the disclosures of which are incorporated herein by reference. The magnetic stripe 240 may also be according to any other technology currently available in the relevant art for a magnetic stripe that may encode information thereon. Other magnetic stripe arrangements may be used as well. The magnetic stripe 240 may be affixed to the pre-printed card member by bonding it to the card using appropriate adhesives or other means of fastening such a magnetic stripe. The magnetic stripe may then be encoded to store a history of a person's radiation exposure, where the radiation exposure history may comprise a currently administered radiation dose and date of dosage; each dose received in a year-to-date total radiation dosage, plus other year-to-date radiation exposure details and totals; and a total tracked radiation dosage. The total tracked radiation dosage may be all the dosages that have been administered since the start of the patient's dosing history, as shown by the history start date 221, which may or may not correspond to when the card was issued. The other year-to-date radiation exposure totals may comprise one or more of: standard annual background radiation exposure; additional radiation exposure from air travel and travel to global regions exhibiting elevated background radiation; and additional radiation exposure from man-made sources as mentioned previously.

Reading and encoding information from and onto the magnetic stripe may be in accordance with expired U.S. Pat. No. 4,197,988 to Moss, and according to expired U.S. Pat. No. 5,286,958 to Smeets for "Method and System for Recording a New Coded Message in Place of an Old Coded Message Recorded on a Magnetic Stripe Carried by a Support Document . . . ", the disclosures of each being incorporated herein by reference. In addition, the reading and encoding may also be accomplished by any other means currently available in the relevant art.

With the combined use of the magnetic stripe 240 and the placard 230, the patient's dosage information on the placard 230 may be coordinated with the data being encoded upon the magnetic stripe, and both may preferably be done—the written and printed operations—using the same patient data base record located on a medical provider's computer, so as to ensure the currency, and uniformity of information contained in both locations.

In a third embodiment of the radiation dose card (FIG. 5A), the front surface 311 of a card 310 may be the same as for card 210, except that in addition to the rectangular area 323, a second rectangular area 323A may also be located on front surface 311. The rectangular area 323A may be used to receive a removable placard 330. Removable placard 330 may, just as did placard 230, list the date and radiation dosage amount of a most recent treatment, but may additionally list the type of treatment used to administer the radiation, which may thus replace the printing of the treatment type on the card itself, as the treatment may, on occasion, vary from visit to visit. A second placard 350, seen in FIG. 5B, may be usable upon rectangular area 323. Placard 350 may have a front surface 351 upon which may be provided dosage history values, and may therefore include both a year-to-date dose that has been administered to the patient, as well as a total tracked radiation exposure of the patient.

Placards 330 and 350 may again be secured to the card 310 using the hook and loop fastening system described previously. Alternatively, they may be secured to the rectangular areas 323 and 323A using a static cling attachment means, such as the one disclosed in U.S. Pat. No. 5,258,214 to Cooledge for "Pre-printed Thin Plastic Film Wall Covering, and Method for Making Same," or the one disclosed in U.S. Pat. No. 6,258,200 to Kassab for "Static-Cling Intermediary," the disclosures of each being incorporated herein by reference.

Use of the static cling means for attaching the placards 330 and 350 to card 310 or the other card embodiments as well, may be supplemented or replaced by the use of adhesive. However, because of the frequency with which the placards may need to be removed and replaced, the adhesive used may preferably be what is referred to as a "fugitive" adhesive, being one that easily permits two substrates to be separated without damaging either material. An example of a fugitive adhesive is the temporary-hold, peel-able adhesive typically used to secure a credit card to a paper product, when initially sent to a consumer from a creditor. Fugitive adhesives may be obtained, for example, from Basic Adhesives, Inc., in Clifton, N.J. Fugitive adhesives are also disclosed in U.S. Pat. No. 7,018,502 to Treleaven, and in U.S. Pat. No. 4,479,838 to Dunsirn, the disclosures of each being incorporated herein by reference. The fugitive adhesive may be applied to only a border region 325, shown cross-hatched on the back surface 352, for placard 350 in FIG. 5D.

On the rear surface 312 of card 310, just below magnetic stripe 340, may be an open area 327, which may be rectangular in shape. In one embodiment, a third placard 360 may similarly be affixed to open area 327 of the rear surface 312 using fugitive adhesive. Placard 360 may advantageously provide a printed listing of each previous radiation dosage, treatment type, treating medical center, and date of the previous radiation dosage, where the dosage/exposure value of each may be added together to comprise the total tracked radiation dosage. In an alternate embodiment, rather than using a third placard 360, the historical information may just be printed directly onto the rectangular area 327. However, use of the separate placard 360 enables the listing to become very long, and thus permits the placard to be folded over upon itself to maintain a more extensive list, which may be secured using a snap, a hook and loop fastening means, or may just be protected using a clear plastic sleeve, as discussed hereinafter.

The three placards together may provide visual information at a glance to inform a medical provider of recent radiation treatments, and past radiation exposures to improve the safety of any planned procedures, as excessive radiation from medical testing does not occur infrequently. The information on the placards may also be encoded onto the magnetic strip, to provide a more permanent record, which may also be shared electronically between providers, and may thus provide a common patient radiation exposure record. Each medical provider may enter treatments incurred while the patient is under their care, and may add such treatment information to the card, and may also immediately, as part of the process, electronically mail the new data to all previous medical providers to keep them informed of the updated data. In addition, a current medical provider may also add any other additional significant exposures to the record, such as the 0.55 mSv. dose of background radiation from a recent transcontinental flight, shown in FIG. 6B. The medical provider can also add treatments/exposures that may have been administered/received prior to issuance of the card, to make for a more complete historical record. An alternative means of tracking radiation exposure might comprise tracking only such exposure in a rolling time period based on the date of the most recent radiation dosage, such as for the last two years, and when a past radiation dosage from a particular treatment eventually falls outside of the selected time period, it may be dropped.

Figures 5A, 5B, 5C, 5D, 5E, 6A, 6B, 7, 8, 9:
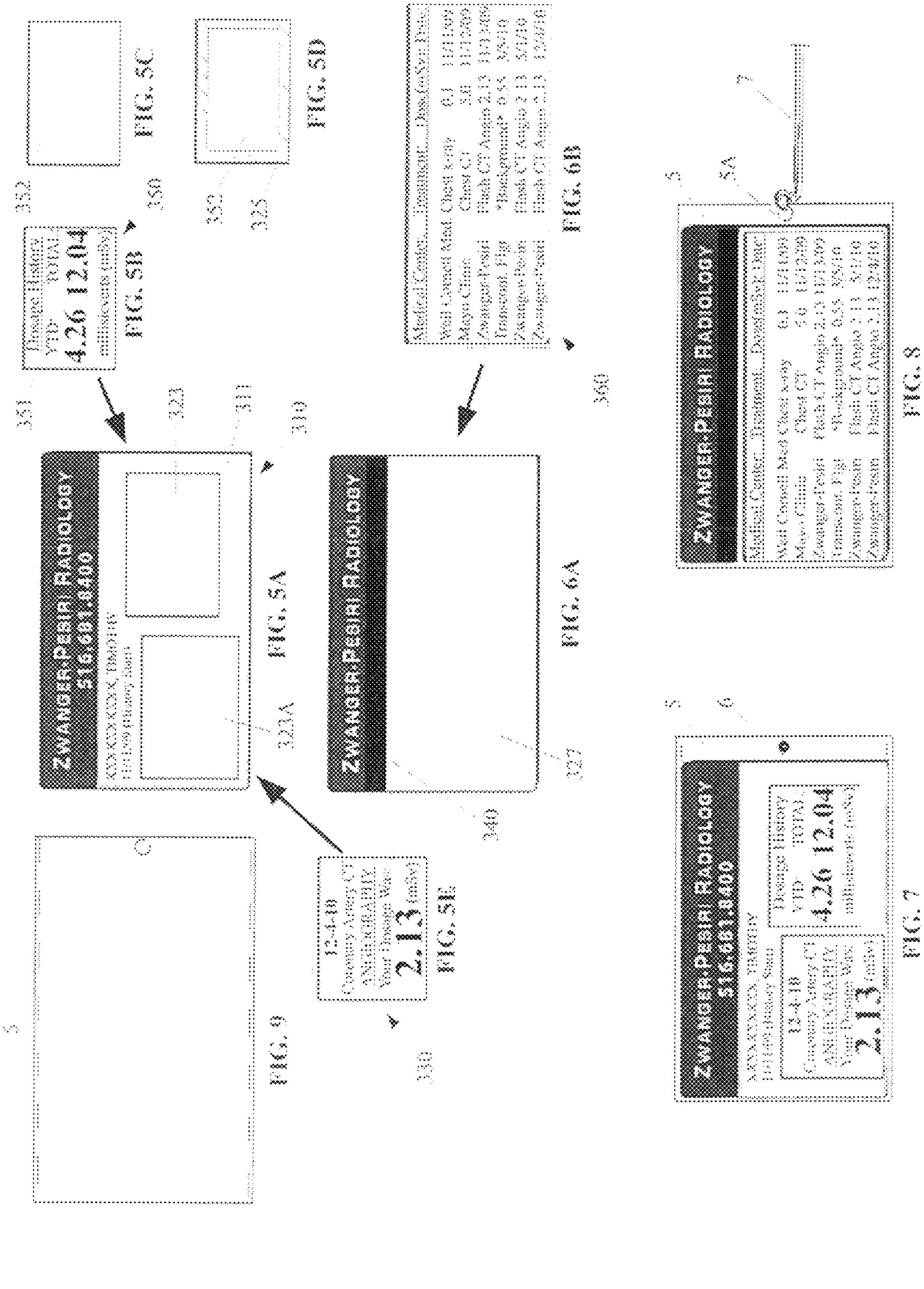
FIG. 5A shows the front side of a third embodiment of the radiation dose card of the present invention, having multiple regions to accommodate two or more dosage placards.
FIG. 5B shows the front side of a first removable dosage placard, for use on the dosage card of FIG. 5A.
FIG. 5C shows the rear side of the removable placard of FIG. 5B, which uses static cling as an attachment means.
FIG. 5D shows an alternate embodiment of the rear side of the placard of FIG. 5B, using a combination of static cling and an adhesive border as an attachment means.
FIG. 5E shows the front side of a second removable dosage placard, for use on the dosage card of FIG. 5A.
FIG. 6A shows the rear side of the dose card of FIG. 5A, having one region to accommodate a dosage history placard.
FIG. 6B shows the front side of a dosage history placard, for use on the rear side of the dosage card, as seen in FIG. 6A.
FIG. 7 shows the front side of the radiation dose card of the FIG. 5A, having two dosage placards being affixed thereon using static cling or an adhesive means, and being protected by a clear plastic slip-on cover that snaps closed.
FIG. 8 shows the rear side of the radiation dose card of FIG. 5A, and being protected by a clear plastic slip-on cover that retains the card therein using a lanyard.
FIG. 9 shows a clear plastic slip-on cover, into which the dosage card of FIG. 5A may be inserted and releasably retained therein.

Because the placards, even when secured using fugitive adhesive, may be subject to degradation possibly resulting in inadvertent removal of the placards from the card, such as may occur with the general wear from wear being inserted into and removed from the user's pocked or wallet, the radiation dose exposure card having removable placard(s) may preferably be secured in a clear plastic protective sleeve 5 (FIG. 9). The clear plastic sleeve 5 may be sized so as to permit the card to slide into an opening in the sleeve, to be surrounded by the clear plastic, as seen in FIG. 7. The clear plastic protective sleeve 5 may thus also serve to protect a lengthy placard 360 that may be folded over several times. The clear plastic protective sleeve 5 may comprise a means of removably securing the radiation dose exposure card therein, such as by using a plastic snap fastener (FIG. 7). One example of such a plastic snap fastener is shown by U.S. Pat. No. 3,965,952 to Rivman, the disclosures of which are incorporated herein by reference. Where the plastic snap fastener is used, each of the two snap pieces may be secured to a side of the plastic sleeve, so that when they are snapped together, they prevent the card from exiting out the opening, and may thus protect even the placard that is applied to the card using the static cling means. Alternatively, rather than the snap fastener, a lanyard 7, as seen in FIG. 8, may be secured though an orifice 5A in each of the sides of the plastic sleeve 5, to maintain the card therein. The lanyard 7 may permit the user to also carry the card around his or her neck.

Figure 12:
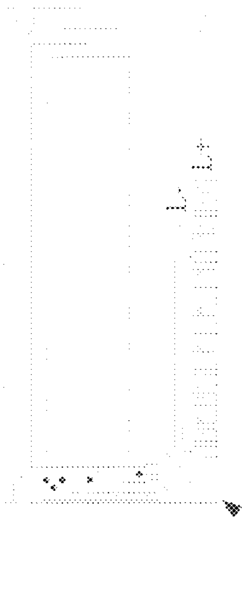
FIG. 12 shows a detailed perspective view of the alphanumeric liquid crystal display and circuit board of FIG. 10.
Figure 13:
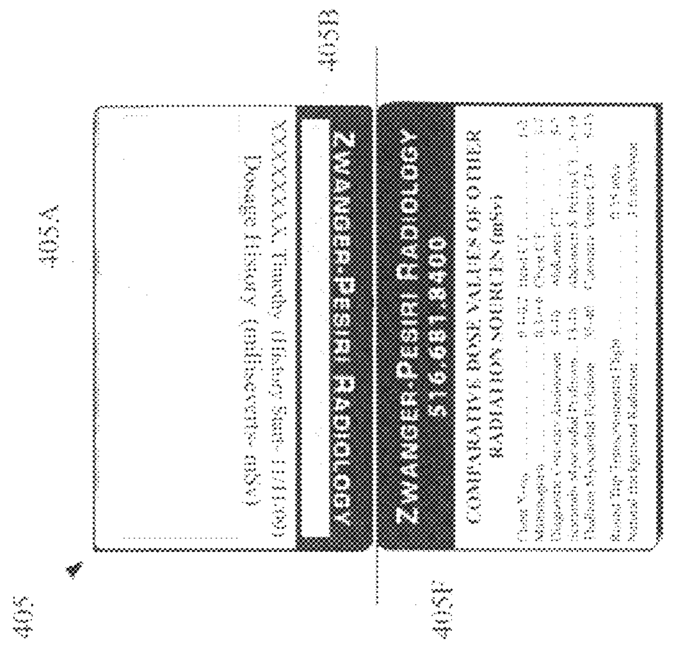
FIG. 13 shows the radiation dose card prior to folding/sealing about the alphanumeric LCD and circuit board of FIG. 12.
Figure 10:
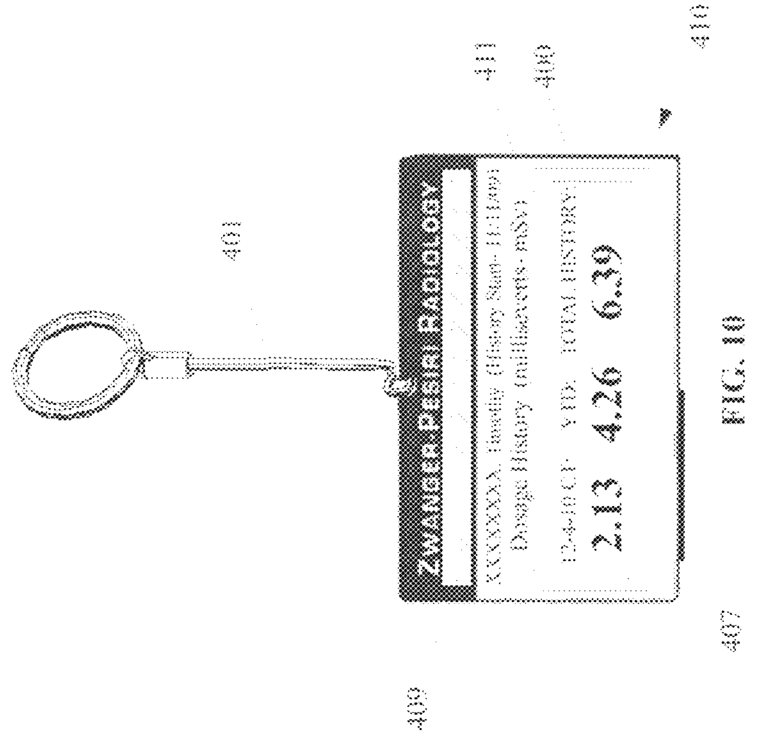
FIG. 10 shows the front side of a fourth embodiment of the radiation dose card of the present invention, having an alphanumeric liquid crystal display being integral to a circuit board about which the dose card is sealed, and having a keychain lanyard attached thereto.
Figure 11:
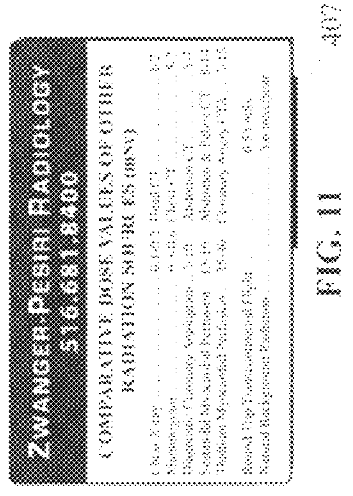
FIG. 11 shows the rear side of the radiation dose card of FIG. 10.
Figure 14:
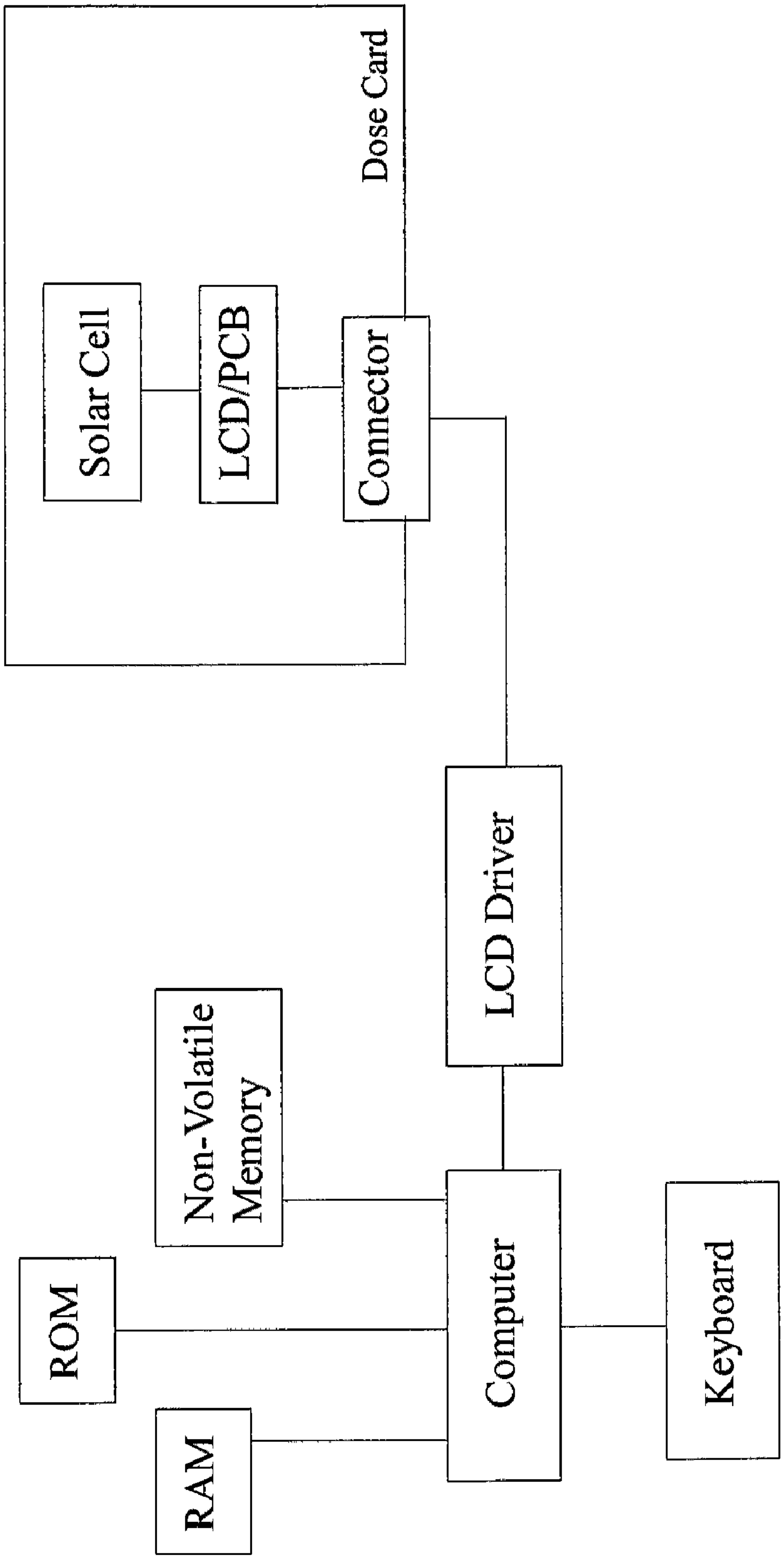
FIG. 14 is a block diagram illustrating the essential parts of a computer system for interacting with and updating the alphanumeric LCD in the radiation dose card of FIG. 10.

In a fourth embodiment of the radiation dose card (FIG. 10), the front surface 411 of a card 410 may comprise a card member, which may be a plastic card member 405 (FIG. 13), and an alphanumeric liquid crystal display (LCD) module 400 (FIG. 12), an LED connector 407, and a solar power strip 409. The LCD module 400 may be purchased from various electrical and industrial suppliers, including the Circuits Shop, with disclosures available at http://www.eleinmec-.com/shop_category.asp?311-liquid-crystal-displays. The card member 405 may have a first opening 405A and a second opening 405B, which may receive the LCD module 400 and solar power strip 409, respectively. The card member 405 may have a fold line 405F, about which the two halves of the card may be folded and then secured to each other using an epoxy adhesive, or any other method available including heating the edges to bond them together. The connector may be purchased from LED Ease at http://www.ledease.com/led-accessories/led-connectors/, and the connector to LCD interface may be according to http://www.lcdinterfacing.info/Interfacing-LCD-with-VB6.php, the disclosures of which are incorporated herein by reference. The solar strip 409 may similarly be secured in the folded card arrangement and serve therein to supply power to the low-power LCD module 400. As seen in the block diagram of FIG. 14, the medical practitioner's computer, containing a database record of the patient's radiation dosages/exposures, may be connected to an LCD driver, which may temporarily be connected to connector 407 of the card 410, to transmit display information thereto, resulting in the displaying of the current dosage/date, YTD dosage/exposure, and total historical radiation exposure value on the LCD module 400 of FIG. 10.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

What is claimed is:

1. A radiation dosage exposure card comprising:

a pre-printed card member; said pre-printed card member having at least a front surface and a rear surface, and a peripheral edge surface;

a magnetic stripe, said magnetic stripe being affixed to said pre-printed card member; said magnetic stripe being encoded to store a history of a person's radiation exposure, said radiation exposure history comprising a currently administered radiation dose and date of dosage; a year-to-date total radiation dosage plus other year-to-date radiation exposure totals; and a total tracked radiation dosage;

at least a first removable placard, said at least a first removable placard comprising at least a visual listing of said currently administered radiation dose and a date of said dosage, said dose and date of dosage being coordinated with said data encoded upon said magnetic stripe, and said at least a first removable placard further comprises listing a method of administering said current radiation dose; and an attachment means; said attachment means serving to removably attach said at least a first placard to said pre-printed card member.

2. A radiation dose exposure card according to claim 1, wherein said history of a person's radiation exposure encoded on said magnetic stripe is coordinated with said currently administered dose and date of dose being printed on said at least a first placard, by said encoding and said printing being accomplished using information stored in a patient database record on a medical provider's computer.

3. A radiation dose exposure card according to claim 2, wherein said at least a first removable placard further comprises a second removable placard, said second placard comprising at least a listing of: a year-to-date total radiation dosage; and a total tracked radiation dosage.

4. A radiation dose exposure card according to claim 3, wherein said at least a first removable placard further comprises a third removable placard, said third placard comprising a list of each previous radiation dosage, treatment type, treating medical center, and date of said previous radiation dosage to comprise said total tracked radiation dosage.

5. A radiation dose exposure card according to claim 4, wherein said means of removably attaching said placard comprises one or more of: hook and loop attachment strips being attached to each of said placard and said card; a static cling arrangement between said placard and said card; and a temporary-hold, peel-able adhesive being used between said placard and said card.

6. A radiation dose exposure card according to claim 5, wherein said card is inserted into a clear plastic protective sleeve, said clear plastic protective sleeve serving to prevent inadvertent removal of said removably attached placard.

7. A radiation dose exposure card according to claim 6, wherein said clear plastic protective sleeve comprises a means of removably securing said card within said sleeve.

8. A radiation dose exposure card according to claim 7, wherein said securing means is from the group of securing means consisting of: a plastic snap fastener; or a lanyard.

9. A radiation dose exposure card according to claim 8, wherein said other radiation exposure totals comprise one or more of standard annual background radiation exposure; additional radiation exposure from air travel and travel to global regions exhibiting elevated background radiation; additional radiation exposure from man-made sources.

10. A radiation dose exposure card according to claim 9, wherein said printing on said pre-printed card comprises at least: a name of an issuing medical practitioner; a mailing address, phone number, and e-mail address of said issuing medical practitioner; a patient's name; and a start date for said tracking of radiation exposure.

11. A radiation dosage exposure card comprising:

a card member; said card member having at least a front surface and a rear surface, and a peripheral edge surface;

a magnetic stripe, said magnetic stripe being secured to said pre-printed card member; said magnetic stripe being encodable to store a history of a person's radiation exposure, said radiation exposure history comprising a currently administered radiation dose and date of dosage; a year-to-date total radiation dosage plus other year-to-date radiation exposure totals; and a total tracked radiation dosage;

at least a first removable placard, said at least a first removable placard comprising at least a listing of said currently administered radiation dose and a date of said dosage, said dose and date of dosage being coordinated with said data encoded upon said magnetic stripe, and said at least a first removable placard further comprises listing a method of administering said current radiation dose; and an attachment means; said attachment means serving to removably attach said at least a first placard to said card member.

12. A radiation dose exposure card according to claim 11, wherein said history of a person's radiation exposure encoded on said magnetic stripe is coordinated with said currently administered dose and date of dose being printed on said at least a first placard, by said encoding and said printing being accomplished using information stored in a patient database record on a medical provider's computer.

13. A radiation dose exposure card according to claim 11, wherein said at least a first removable placard further comprises a second removable placard, said second placard comprising at least a listing of: a year-to-date total radiation dosage; and a total tracked radiation dosage.

14. A radiation dose exposure card according to claim 13, wherein said at least a first removable placard further comprises a third removable placard, said third placard comprising a list of each previous radiation dosage, treatment type, treating medical center, and date of said previous radiation dosage to comprise said total tracked radiation dosage.

15. A radiation dose exposure card according to claim 11, wherein said means of removably attaching said placard comprises one or more of: hook and loop attachment strips being attached to each of said placards and said card; a static cling arrangement between said placards and said card; and a temporary-hold, peel-able adhesive being used between said placard and said card.

16. A radiation dose exposure card according to claim 11, wherein said card is inserted into a clear plastic protective sleeve, said clear plastic protective sleeve serving to prevent inadvertent removal of said removably attached placard.

17. A radiation dose exposure card according to claim 16, wherein said clear plastic protective sleeve comprises a means of removably securing said card within said sleeve.

18. A radiation dose exposure card according to claim 17, wherein said securing means is from the group of securing means consisting of: a plastic snap fastener; or a lanyard.

19. A radiation dose exposure card according to claim 11, wherein said other radiation exposure totals comprise one or more of: standard annual background radiation exposure; additional radiation exposure from air travel and travel to global regions exhibiting elevated background radiation; additional radiation exposure from man-made sources.

20. A radiation dose exposure card according to claim 11, wherein said card member comprises a pre-printed card, said pre-printing comprising at least: a name of an issuing medical practitioner; a mailing address, phone number, and e-mail address of said issuing medical practitioner; a patient's name; and a start date for said tracking of radiation exposure.

21. A method of tracking a patient's radiation exposure comprising:

issuing a patient a radiation dose exposure card, said radiation dose exposure card comprising a card member, one or more dose placards removably attached thereto, and a magnetic stripe attached to said card member;

using a computer to maintain a record of a currently administered radiation dose, and all past radiation doses and exposures;

printing said currently administered dose and date of dose on a first placard;

printing, on a second placard, a listing of: a year-to-date total radiation dosage; and a total tracked radiation dosage;

printing, on a third placard, a list of each previous radiation dosage, treatment type, treating medical center, and date of said previous radiation dosage to comprise said total tracked radiation dosage; and encoding said listings from said first, second, and third placards onto said magnetic stripe using a reader/writer; sending an e-mail alert from a current practitioner to all previous practitioners others of said listings from said first, second, and third placards.

22. A system for tracking a patient's radiation exposure comprising:

a radiation dose exposure card, said radiation dose exposure card comprising a card member, one or more dose placards removably attached thereto, and a magnetic stripe attached to said card member;

a computer for maintaining a record of a currently administered radiation dose, and all past radiation doses and exposures within a selected time period;

a first means for printing said currently administered dose and date of dose on a first placard;

a second means for printing, on a second placard, a listing of: a total radiation dosage for said selected time period; and a total tracked radiation dosage;

a third means for printing, on a third placard, a list of each previous radiation dosage for said selected time period, treatment type, treating medical center, and date of said previous radiation dosage to comprise said total tracked radiation dosage;

a means for encoding said listings from said first, second, and third placards onto said magnetic strip; and a means for sending an e-mail alert from a current practitioner to all previous practitioners of said listings of said first, second, and third placards.

23. The system according to claim 22 wherein said first, second, and third means for printing comprise a single means for printing.

24. The system according to claim 22 wherein said selected time period is a rolling time period based on said date of a most recent radiation dosage.

25. The system according to claim 24 wherein past radiation dosages that are outside said selected time period are dropped from the past radiation doses and exposures.

* * * * *